(12) United States Patent
Sundhar

(10) Patent No.: US 6,453,678 B1
(45) Date of Patent: Sep. 24, 2002

(54) DIRECT CURRENT MINI AIR CONDITIONING SYSTEM

(75) Inventor: Shaam P. Sundhar, Princeton, NJ (US)

(73) Assignee: Kabin Komfort Inc, Mt. Prospect, IL (US)

(*) Notice: Subject to any disclaimer, the term of this patent is extended or adjusted under 35 U.S.C. 154(b) by 0 days.

(21) Appl. No.: 09/945,950

(22) Filed: Sep. 4, 2001

Related U.S. Application Data
(60) Provisional application No. 60/230,101, filed on Sep. 5, 2000.

(51) Int. Cl.[7] .................................. F25B 21/02
(52) U.S. Cl. ..................... 62/3.2; 62/244; 62/235.1; 62/236
(58) Field of Search ................. 62/3.2, 3.61, 457.2, 62/457.9, 235.1, 236, 239, 240, 244

(56) References Cited

U.S. PATENT DOCUMENTS

| | | | |
|---|---|---|---|
| 4,658,597 A | * | 4/1987 | Shum ................... 62/235.1 |
| 4,939,911 A | * | 7/1990 | Mandell ................. 62/239 |
| 5,277,038 A | * | 1/1994 | Carr ...................... 62/434 |
| 5,714,806 A | * | 2/1998 | Goto et al. ............. 307/10.1 |
| 5,901,572 A | * | 5/1999 | Peiffer et al. ........... 62/480 |
| 6,094,919 A | * | 8/2000 | Bhatia ................... 62/3.7 |
| 6,253,563 B1 | * | 7/2001 | Ewert et al. ........... 62/235.1 |

* cited by examiner

Primary Examiner—Denise L. Esquivel
Assistant Examiner—Melvin Jones
(74) Attorney, Agent, or Firm—Ourpal® Asija

(57) ABSTRACT

An air conditioning unit is provided for a parked truck/boat to cool the sleeping cabin. The cabin air conditioner having a cooling unit comprising a cooling chamber with at least one insulated wall having on opposite sides there of a heat sink and a cooling block having there between thermoelectric chip(s) or a high efficient D.C. compressor or cold storage phase change material. The air conditioning unit also comprises an air intake conduit, a cool air conduit, an exhaust conduit and means of supplying power to the cooling unit. A method for cooling the. sleeping cabin through the use of the air conditioning unit disclosed in the invention is also provided.

20 Claims, 4 Drawing Sheets

DIRECT CURRENT MINI AIR CONDITIONING SYSTEM

RELATED DOCUMENT

Figure 1:
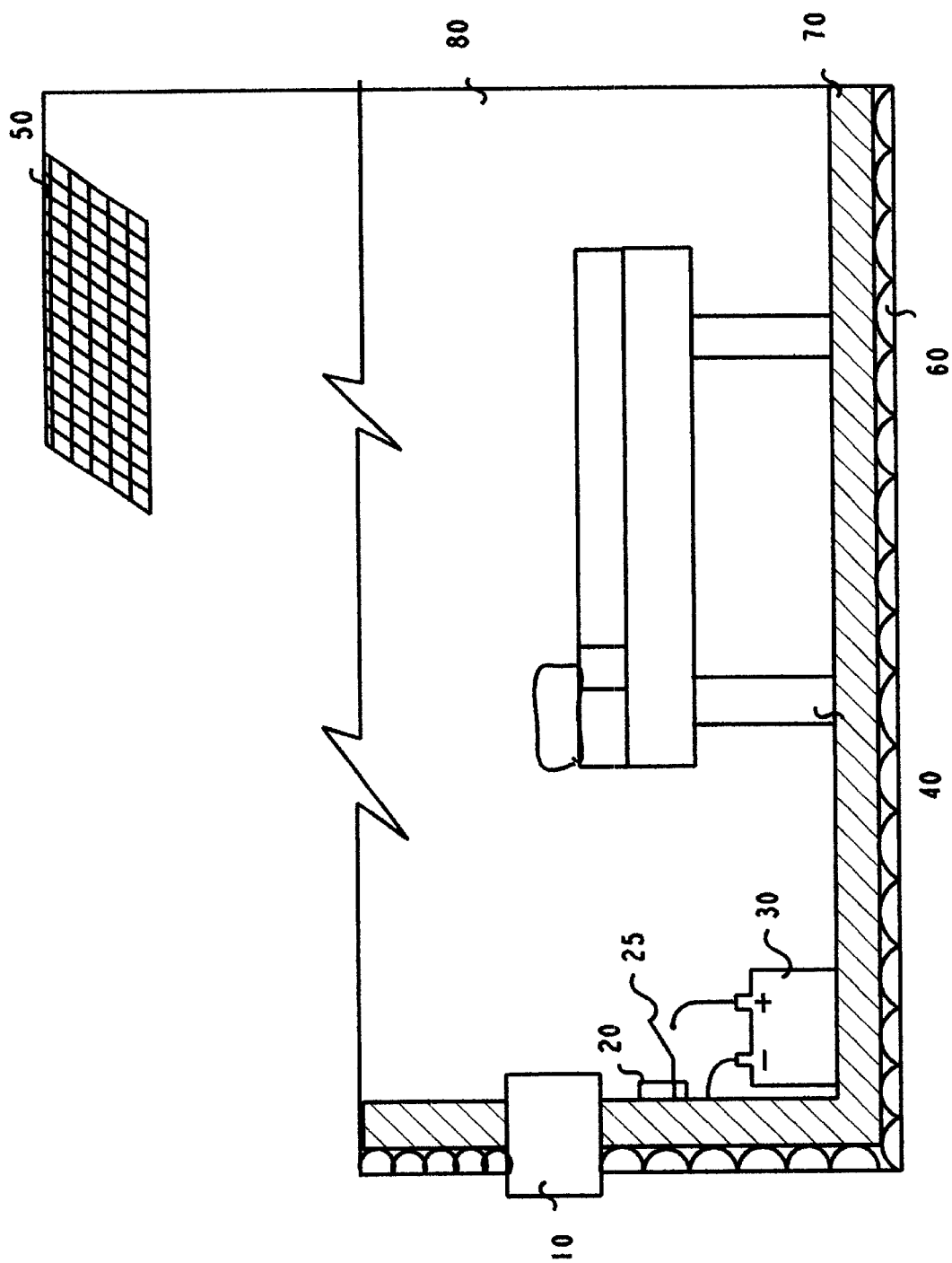

This utility patent application is based on provisional application number 60/1230,101 filed Sep. 5, 2000 then entitled "KABINKOOL—Parked Truck/Boat Cabin AC System" which in turn was based on the disclosure document number 478284 filed with the USPTO on Aug. 14, 2000 then entitled "Kool King or Kabin Kool" For brevity the invention is sometimes referred to by its trademark name of KABIN-KOOL

BACKGROUND

This invention relates to an air-conditioning system for cabins of motor vehicles and watercrafts and aircrafts etc. More particularly it relates to an air-conditioning system where a thermo electric chip is used and/or direct current battery such that the air-conditioning is operative even without the idling the engine of the motor vehicle or watercraft.

THE PROBLEM

Truck drivers who spend major portion of their lives on road need rest & sleep at times. Usually they park in a rest house parking lot or on truck stops to get some sleep. The problem is to beat the heat in the cabin, they have to turn on the truck air conditioner. This means running the truck engine at idle condition. Even though this solves the problem but it creates many others.

The noise of idling engine & the horrendous pollution it creates are the major problems. The gasoline consumption when the trucker is sleeping for 4 to 8 hours puts a dent on their economy operation. Similar problem exists for Boat Cabins & small cabins of tents when camping.

It is thus apparent that the need exists for an apparatus for cooling the cabins which provides adequate cooling of the air in the sleeping compartment as well as conserving the fuel.

SUMMARY OF INVENTION

A personal direct current mini air-conditioning system for confined space for parked truck/boat sleeping cabins comprises a thermo electric chip. Means of supplying the power for the air conditioner preferably is by at least one deep cycle marine battery which is trickle charged by a solar panel positioned above the roof. Also, this auxiliary marine battery may be charged by the Alternator of the truck/boat, when the main, engine is running. Preferably the cooling unit itself is located near the sleeping area.

The system of this invention comprises a direct current air conditioning system in the cabin of a motor vehicle, or aircraft or watercraft or the like. It may optionally include a thermo electric module. In the preferred embodiment the inventor used the direct current power source and maintained the temperature at around 65 degrees F.

PRIOR ART

A formal prior art search was not conducted but the inventor is intimately familiar with the prior art. Typical examples of the prior art known to the inventor or his attorney are the air-conditioners that require idling of the engine.

Unfortunately none of the prior art devices singly or even in combination provide all of the features and objectives established by the inventor for this system as enumerated below.

OBJECTIVES

1. It is an objective of this invention to provide method, devices and system for cooling the cabin of a motor vehicle, aircraft or watercraft while obviating the idling of the engine.

2. Another objective of this invention is to provide a mini air conditioning system which is solid state with virtually no moving parts.

3. Another objective of this invention is that it be long lasting made from durable material.

4. Another objective of this invention is that it is easy to use, store and transport.

5. Another objective of this invention is that its use be intuitive that requires little additional training.

6. Another objective of this invention is that it be physically safe in normal environment as well as accidental situations.

7. Another objective of this invention is that it be environmentally friendly and safe and made from biodegradable materials to the extent practical.

8. Another objective of this invention is that it meet all federal, state, local and other private standards, guidelines and recommendations with respect to safety, environment, quality and energy consumption.

9. Another objective of this invention is that once set, it maintain constant comfortable temperature adjustable in the range of 65 to 75 degrees ie. up to 40 degrees below ambient and humidity of approximately 70% automatically without any intervention or attention from the user.

10. Another objective of this invention is that it be made of modular parts and units easily interface-able to each other.

11. Another objective of this invention is that the personal mini air-conditioning system of this invention be suitable as an accessory for OEM as well as for the retrofit after market.

12. Another objective of this invention is that the personal mini air-conditioning system of this invention is suitable for use anywhere with limited space.

13. Another objective of this invention is that the personal air conditioning system of this invention is suitable for use by anybody.

14. Another objective of this invention is that it be suitable for gift giving.

15. Another objective of this invention is that it be suitable for promotional give aways complete with message of the sponsor such as a casino or church or cigar makers.

16. Another objective of this invention is that the personal cabin cooling system of this invention be of high quality with high aesthetic eye appeal.

17. Another objective of this invention is that the direct current mini air conditioning system of this invention have a small foot print.

18. Another objective of this invention is that the personal mini air-conditioning system of this invention is capable of cooling to and automatically maintaining a constant temperature around 65 degrees Fahrenheit and humidity of about 70 percent.

19. Another objective of this invention is to provide an air conditioning unit for parked truck/boat which dehumidifies the cabin compartment.

20. Yet another important object of the present invention is to provide an air conditioning unit for the parked truck/boat cabin which is energy efficient and does not deplete the fuel of the vehicle.

Thus in summary it is the primary object of the present invention to provide an air conditioning unit to keep the cabin compartment of the truck and/or boat from becoming excessively hot while the truck/boat is parked by supplying of cooler air to the cabin compartment and removal of excessively warm air from the cabin.

Other objectives of this invention reside in its simplicity, elegance of design, ease of manufacture, service and use and even aesthetics as will become apparent from the following brief description of the drawings and concomitant description.

Figure 2:
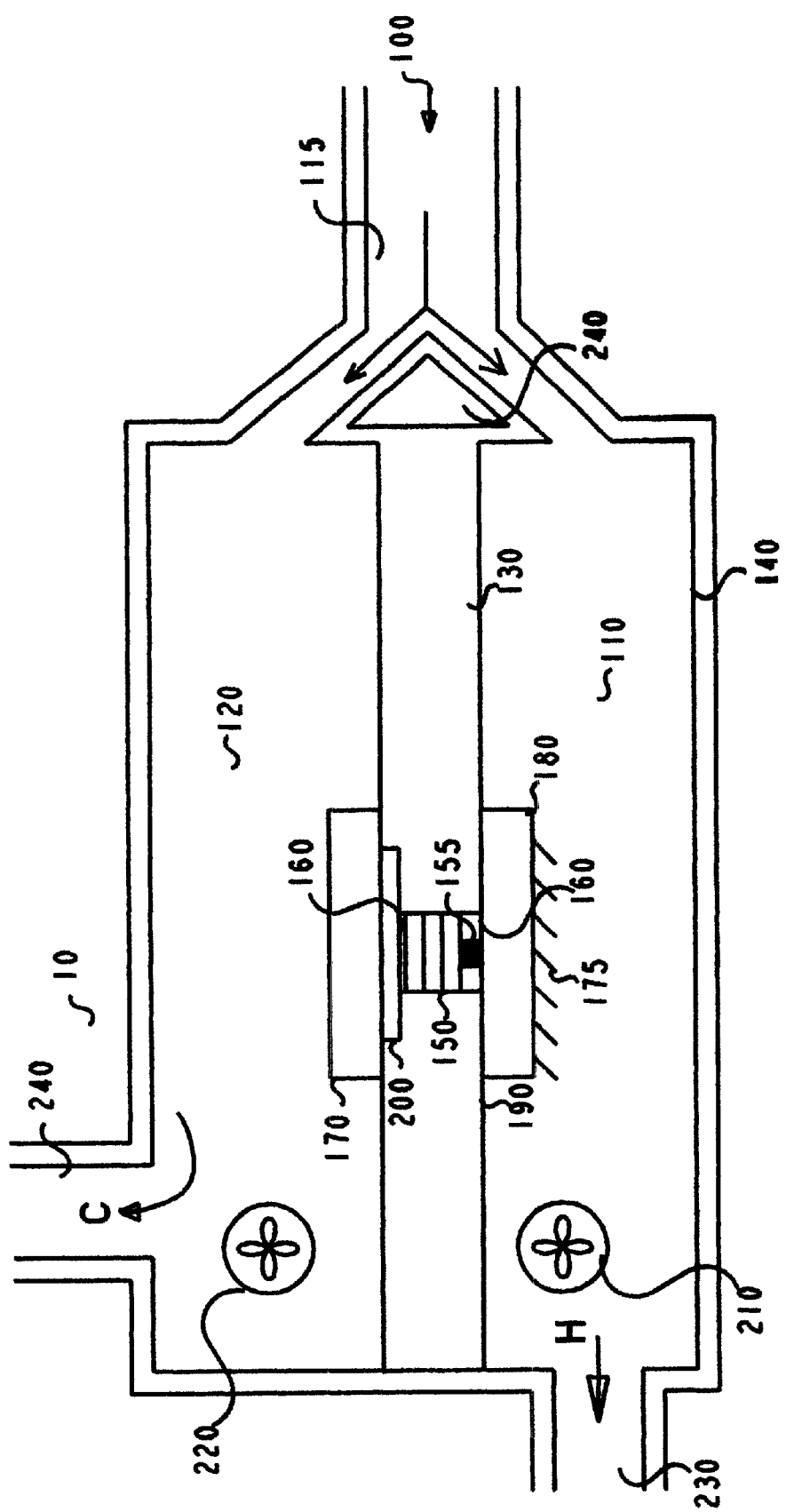
Figure 3:
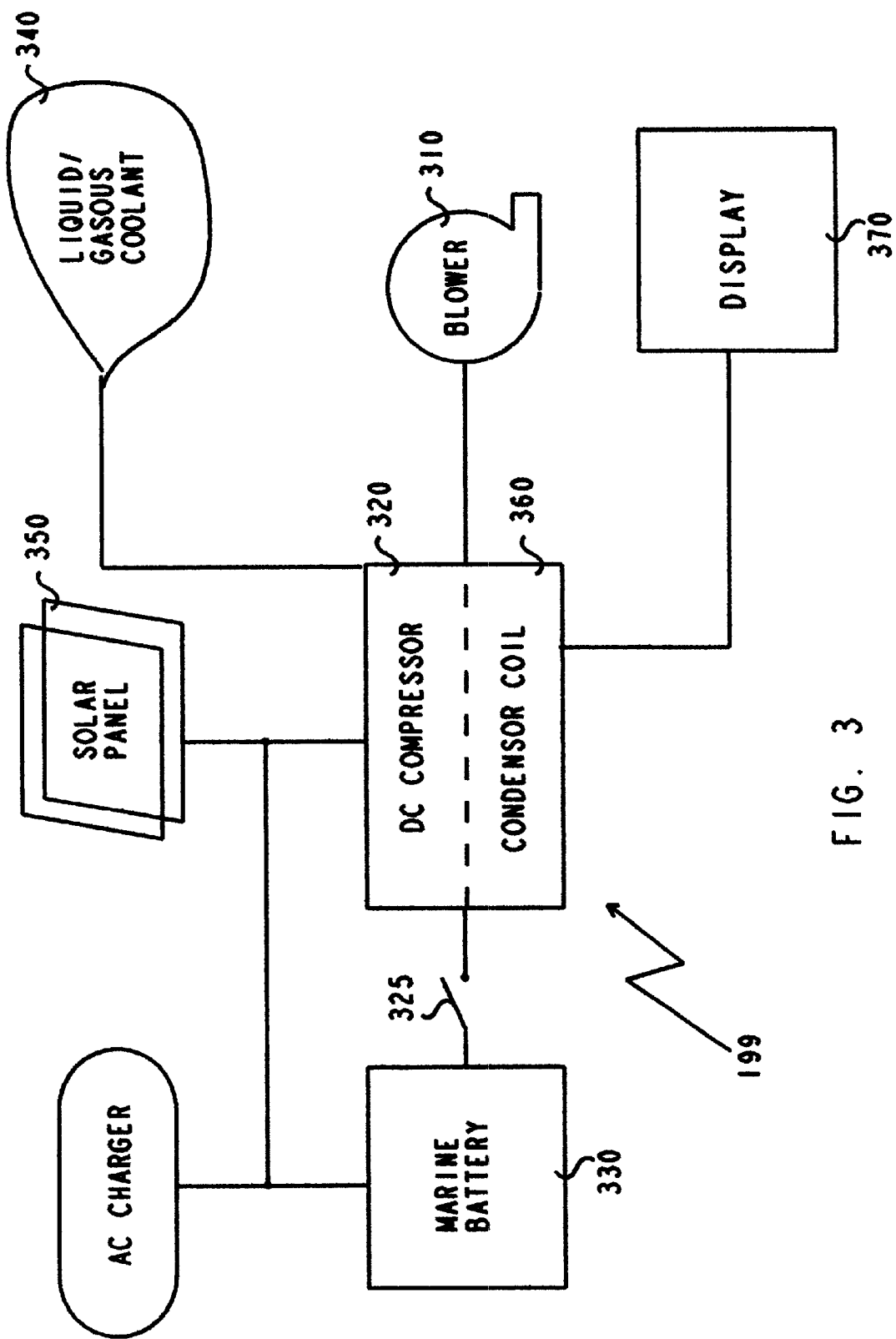
Figure 4:
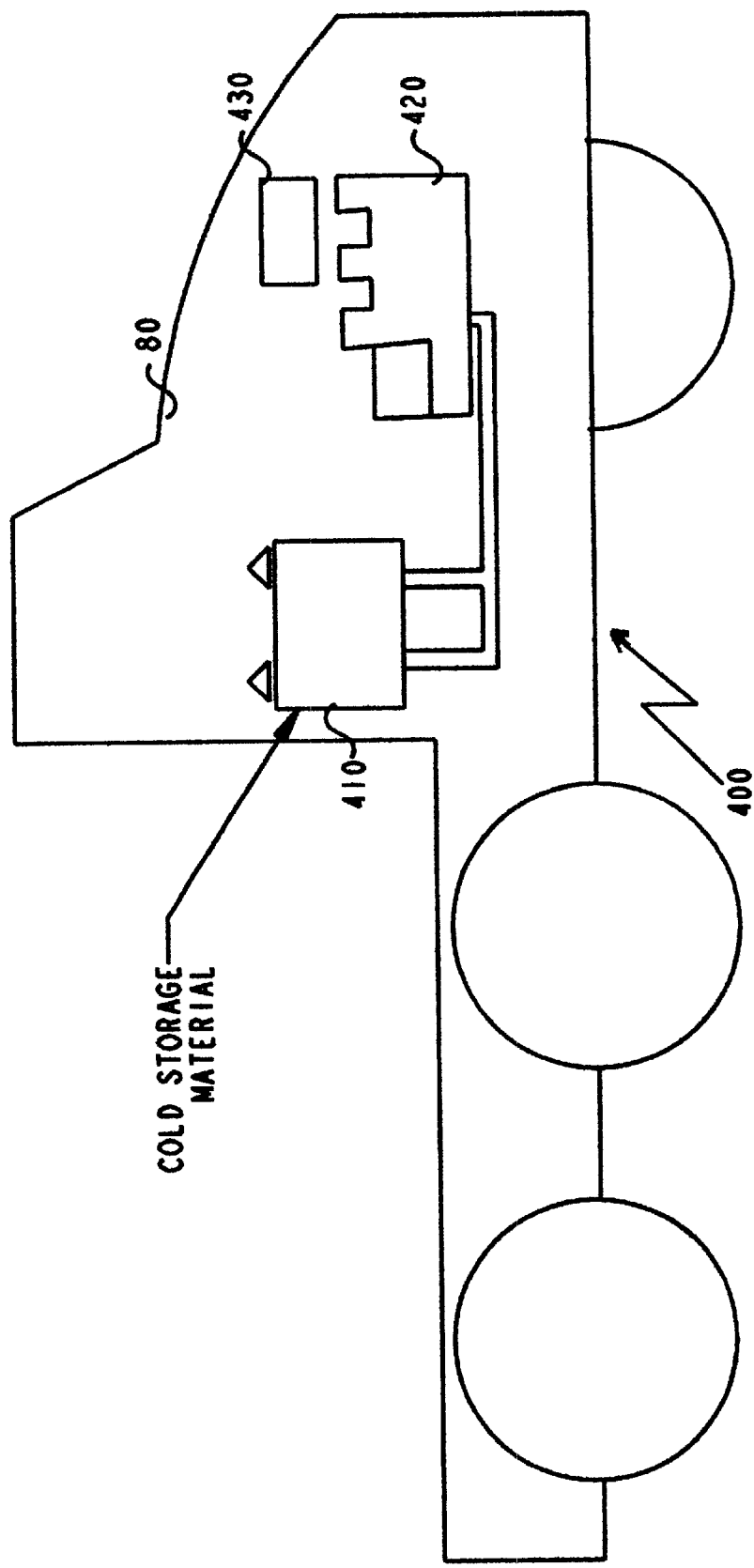

BRIEF DESCRIPTION OF THE DRAWINGS a) FIG. 1 shows a typical layout of the preferred embodiment of the invention in the cabin of a motor vehicle complete with sleeping bunk, direct current battery, thermoelectric chip bank on a heat sink and solar panel.

b) FIG. 2 shows a more detailed layout of the preferred embodiment utilizing Thermoelectric technology complete with ambient air intake, hot air vent, cool air to the cabin generated by the thermoelectric chip bank on a heat sink.

c) FIG. 3 shows a block diagram of an alternate embodiment utilizing a high efficiency direct current compressor energized by a marine battery and optionally charged by the alternator of the motor vehicle engine and or solar panel.

d) FIG. 4 shows yet another alternate embodiment utilizing cold storage phase change material energized by the direct current battery of the motor vehicle cabin and optionally charged by the alternator of the motor vehicle engine and or solar panel.

DETAILED DESCRIPTION OF THE PREFERRED EMBODIMENT

The compact, convenient and solid state personal direct current mini air-conditioning system 99 of this invention as shown in the drawings wherein like numerals represent like parts throughout the several views, there is generally disclosed in FIG. 1 a typical layout of the preferred embodiment of the invention in the cabin 80 of a motor vehicle 400 complete with sleeping bunk 40, direct current battery 30, thermoelectric chip 25 bank on a heat sink and solar panel 50.

The essence of the preferred embodiment comprises a thermo electric module which in turn comprises a solid state thermo electric chip. The system also includes a heat sink, a cold sink and a direct current power source as well as a switch and associated hardware.

FIG. 2 shows a more detailed layout of the preferred embodiment utilizing Thermoelectric technology complete with ambient air intake, hot air vent, cool air to the cabin generated by the thermoelectric chip bank on a heat sink.

Having reference to the drawings, attention is directed first to FIG. 1, which illustrates the air conditioning system 99 of the preferred embodiment of this invention as it is installed in its operative position, with air conditioning unit designated generally by the numeral 10. As can be seen, the invention is installed in operative relationship in a truck/boat cabin 80 and has one of its primary component, a cooling unit 1 positioned interiorly near the sleeping area 40 of the cabin 80.

As can be seen in FIG. 1, the preferred embodiment cooling system 99 in addition to the cooling unit 10, comprises two other primary components viz the electronic thermostatic controller 20 and the deep cycle marine battery 30. Cooling unit is disclosed in more detail in FIGS. 2–4.

Figures one and two illustrate the preferred embodiment utilizing the thermoelectric chips on heat sink. Figure three illustrates first alternate embodiment utilizing high efficiency direct current compressor and also energized by a marine direct current battery. Figure three illustrates a second alternate embodiment employing cold storage phase change material. As can be seen in FIG. 2, the cooling unit 10 of this invention discloses one of the many ways that accomplishes the desired cooling purpose.

FIG. 2 discloses the preferred embodiment, solid state electronic cooling. Thermoelectric cooling unit 10 having a means of ambient air intake conduit 100. This conduit 100 extends from outside of the cabin 80 into the interior. This inlet ambient air is incorporated in the cooling unit 10 itself. Cooling unit 10 comprises of a hot air chamber 110 and a cool air chamber 120, having insulated walls 140, with the most important insulated wall being a center dividing wall 130. A power conduit 150 extends from electric thermostat controller 20 of FIG. 1, preferably through the air intake conduit 100 into the hot air chamber 110 and then to the insulated walls 140 where the power conduit 130 is secured to thermoelectric chip 150.

The thermoelectric chip 155 is typical of those already in existence, such as the semi conductor material Bismuth Telluride is doped to make 'p' and 'n' materials. The small pieces (legs) of these 'p' and 'n' materials are connected electrically in series and thermally in parallel. This arrangement is sandwiched between two ceramic plates. Two wires are soldered, one to the starting p material leg which is labeled as positive and the other wire to the last n material leg which is labeled as negative. The thermoelectric chip is positioned between two adhesive layers 160, one of which is in contact with hot side heat sink 180, having back wall 190 and a plurality of horizontally disposed fins 175 on heat sink 180 to assist in the disposition of heat as the hot air passes through & over the fins 175. The other adhesive layer 160 is in contact with a heat conducting block 200. Although in the embodiment of this invention 99, the cold temperature conducting block 200 serves to provide a cooling portion 170 preferably in the form of a plurality of horizontally disposed fins 175 which cools the air in the cool air chamber 120 as the air passes over the and through the fins 175. The cool temperature conducting block 200 is preferably fabricated from aluminum. Maximum heat absorption and cooling occurs when the air entering chamber 10, due to the location of the air access, passes directly over the fins 175.

Two fans 210, 220 assist in circulating the hot air into the hot air chamber and thence from it, helping to circulate the cool air from the cool air chamber into the sleeping cabin 80 in FIG. 1. The first of these fans is an exhaust fan 210 which helps to draw air through an air intake port 100 past the heat sink 180 and its fins 175 and then expel the heated air through exhaust conduit 230 having a closure means in the form of either a filter or one-way valve. Meanwhile, the cooling fan 220 also draws air from conduit 150 across the cooling portion block 200 and forces through the cool air conduit 240 into the sleeping cabinet 80. Power for both of these fans 210, 220 is also preferably provided by the power conduit 150 which takes its energy from the auxiliary battery 30 in FIG. 1. or 330 in FIG. 3

ALTERNATE EMBODIMENTS

FIG. 3 shows a block diagram of an alternate embodiment utilizing a high efficiency direct current compressor 320 energized by a marine battery 330 and optionally charged by the alternator of the motor vehicle engine 420 and or solar panel 350.

This alternate method of achieving the purpose of this invention is to use the technology of a small high efficiency DC compressor 320 driven air conditioner 199 of a minimum 2,400 BTU capacity as shown in FIG. 3, to cool the sleeping cabin 80. This DC air conditioner 199 may be placed above the battery 30 in FIG. 1 corresponding to 330 in FIG. 3. The battery 330 energizes either the Thermoelectric Chips 155 or the compressor 320 of DC air conditioner 199. The battery 330 also energizes the fans 210, 220.

In this alternate embodiment KABINKOOL is a battery operated refrigeration system 199, that is, it uses direct current to run the compressor 320. However, one can use alternate current (AC) equipment such as battery charger to charge the battery first and then connect the battery to the DC air conditioner.

Another source of power that can use is DC generator, but it must have a stable voltage. One can operate 12V KABINKOOL directly from a converter or rectifier, provided that the rectifier or converter has a stable 12V output and capable of producing high start-up or surge current. It may be cheaper to use battery and solar modules to recharge the battery.

In this alternate embodiment the inventor utilized the following specifications for the DC Air Conditioner but variations of it may be equally satisfactory.

a) Compressor: 12V or 24V DC compressor
b) Cooling capacity: 600 watts (2040 Btu)
c) Cooling space: 7ft×7 ft×7 ft (343 ft$^3$)
d) Electricity: DC 12V @15 A & DC 24V @7.5A
e) Refrigerant: HFC-134a
f) Ambient air temperature: 24 to 33 degrees C.
g) Room temperature: 23 to 25
h) Thermostat: UT72, temperature ranges ~30 to +30 degrees C.
i) Dimensions: (L×B×H): 32.0 in×29 in×18 in
j) Weight (approximately): 32 kg The latest "AGM" (Absorbed Glass Mat) battery has a full 100% recharge rate. Most battery-operated systems use solar module as a recharging device. The sun is free and more practical in the long run. Furthermore it is very convenient in areas without electricity. The requirement of the solar module power depends on the current consumption.

KABINKOOL can use normal motor vehicle battery to operate. In fact any 12 Volt battery source which is easily available. In general it is all the time lead acid type. However alkaline battery is getting popular and at the moment they are expensive Solar deep cycle battery is preferable for storage of solar converted electricity. The normal truck battery is good and will last longer if each recharging can top-up to its maximum capacity. However in solar recharging system, battery is almost drained flat and recharging by solar modules cannot guarantee full recharge every time. Most of the time recharging is very slow. Hence most car battery can last about 2 years. Solar deep cycle battery does not have this problem and will last about 5 years in normal service.

For any 12V/24V system, the problem is recharging the battery after it is drained flat. In a vehicle, the practice is to divert a separate wire from the vehicle's dynamo to charge the battery meant specifically for running the air-con. In this way, one can have days of comfortable 12V air-con running in the camp. For a 12V battery with a power capacity 240AH, the 12V KABINKOOL will last for about 10 hours without recharging on continuous operation, as KABINKOOL consumes about 18.75 AH. When KABINKOOL is running with thermostatic control of 70:30 on-off cycle, 240AH battery can last for about 16 hours.

FIG. 4 shows yet another alternate embodiment utilizing cold storage phase change material 410 energized by the direct current battery 430 of the motor vehicle cabin 80 and optionally charged by the alternator 425 of the motor vehicle engine 420 and or solar panel 50, 350. This embodiment utilizes "Phase Change material" 410 which holds the needed cold temperature as shown in FIG. 4. When the truck or boat is parked then this cold storage material absorbs the heat in the cabin for 8 hours thus keeping the cabin cool. The phase change material is "Charged" by the regular truck air conditioner while driving.

OPERATION

Comfort of a person depends upon temperature, humidity, air quality and circulation. Body adjustments are accomplished by the circulatory and respiratory systems. When sweat evaporates, it takes away heat in the form of heat of vaporization from the body and cools it. Human body gives off and absorb heat by the three methods of heat transfer: conduction, convection and radiation. Evaporation, in the form of perspiration, could be considered the fourth way. The surroundings must be cooler than the body for the body to be comfortable. Typically, when the body is at rest, such as sitting, in a surrounding of 25 degrees Celsius (77 Degrees Fahrenheit) and 50% humidity with a slight air movement, the body is being comfortable during a hot day.

KABINKOOL is suitable for any insulated room around 350 cu.ft. (10 cu in). For a room of this size our air-con can maintain the temperature for around 23 to 25 degrees Celsius and humidity of about 50%. The most important characteristic with this is that it will reduce the humidity inside the room, hence you will feel comfortable and cool even though the temperature is around 27 degrees C. The dehumidifying capacity of KABINKOOL is about 1 gallon of water per day. The smaller the room, the lower the temperature will be.

It is advisable to keep the KABINKOOL away from other heat sources, e.g. engine room, which will increase the current consumption of your KABINKOOL. Always operate the unit with high fan speed to get maximum cooling capacity. The portable 12V/24V KABINKOOL very useful for camping tent. In fact it can be used for any small rooms. One of the practical functions for our KABINKOOL is in interstate truck's sleeper cabin.

KABINKOOL'S cooling capacity is only about 2040 Btu (600 watts). For rough estimation purposes, a person needs about 5 Btu per cu ft of well insulated space. For 7×7×7 feet volume, this amounts to 1,715 BTU. In addition to this, while asleep a person generates about 275 Btu (80 watts) of heat load. Therefore, a 2040 BTU capacity air conditioner will do the job adequately.

The use and operation of this device by a consumer is simple and even intuitive. Nonetheless the inventor recommends the following steps:

a) The cabin is first insulated with the Insulation of high "R" value. The Aerogel, Vacuum Panels & similar insulation may be used.
b) Second, a solar panel is mounted on the roof of the cabin which generates sufficient electricity to at least trickle charge a marine battery.
c) A marine deep cycle discharge battery of at least 240AmpHr capacity is placed in the cabin. The solar panel trickle charges this battery when the cabin cooler is not in use. Also, a wire may be connected from the truck alternator to charge the battery when the engine is turned on.

d) A plastic box containing solid state cooling Thermo-electric Chips of total capacity of 2,400 BTU (minimum) is placed above the battery. The box also contains the blower to blow the cold air to the cabin. A fan which blows the air on the hot side of the heat sink is vented out side the cabin. A small hole may be drilled for this purpose.

The solid state electronic Thermoelectric "Chip" cools a given volume of space without bulky compressors, CFC gases, coils etc. This space age technology uses the power from direct current source and keeps the cabin of a motor vehicle, watercraft, aircraft or the like confined space at the right temperature and humidity. By varying the current the inside temperature of the humidor can be accurately varied. An HQ circuit senses the temp and with the help of a thermostat it keeps the temperature at a pre- set level. The batteries are rechargeable. The operator after preparing the cabin as per instructions merely connects the mini-air-conditioning system to the direct current battery of the motor vehicle. Optionally Alternating current charger of the motor vehicle and a solar panel may be connected for more efficient use and longer life of the battery.

The inventor has given a non-limiting description of the concept. The simplicity and the elegance of the design of this invention makes it difficult to design around it. Nonetheless many changes may be made to this design without deviating from the spirit of this invention. Examples of such contemplated variations include the following:

1. The shape and size materials of the various members and components may be modified.
2. A different thermoelectric module may be used.
3. The color, aesthetics and materials may be enhanced or varied.
4. Additional complimentary and complementary functions and features may be added.
5. A more economical version of the device may be adapted.
6. An informational or advertising message may be incorporated for promotional give aways.
7. A different type of insulation may be provided.
8. The volume and the cooling capacity may be varied by use of a thermoelectric module of appropriate specifications.

Other changes such as aesthetics and substitution of newer materials as they become available, which substantially perform the same function in substantial the same manner with substantially the same result without deviating from the spirit of the invention may be made.

Following is a listing of the components uses in this embodiment arranged in ascending order of the reference numerals for ready reference of the reader.

10=Air conditioning unit of the preferred embodiment 99
20=Electronic thermostatic controller
25=Switch
30=Deep cycle marine direct current battery
40=Sleeping Bunk
50=Solar panel
60=Cabin Exterior Floor
70=Cabin Interior Floor
80=Cabin of a motor vehicle
99=Air conditioning system of the preferred embodiment
100=Ambient air intake
110=Hot air chamber interfaced heat sink
120=Cool air chamber interfaced to cooling member chip
115=Ambient air path bifurcation
120=Cool air chamber
130=Center dividing wall
140=Outside insulated walls
150=Thermoelectric Power conduit
155=Thermo-electric integrated circuit chip
160=A Pair of adhesive:layers
170=Cooling member
175=Fins on heat sink
180=Heat Sink
190=Heat sink interface to dividing wall
199=DC Compressor embodiment
200=Cooling Block
210=Hot air exhaust fan
220=Interface fan for cool air to cabin
230=Hot air outlet
240=Cool air for the cabin
299=Phase Change Material embodiment
310=Fan blower
320=DC Compressor
25=Switch
330=Deep cycle direct current marine battery
340=Refrigerant-Liquid or gaseous coolant
350=Solar panel
360=Condenser coil
370=Digital display
400=Motor vehicle body generally
410=Cold storage phase change material
420=Motor vehicle engine and Air conditioner
425=Alternator charger of a motor vehicle

DEFINITIONS AND ACRONYMS

A great care has been taken to use words with their conventional dictionary definitions. Following definitions are included here for clarification.

3D=Three Dimensional
CFC=Chloro-Floro Carbon
DIY=Do It Yourself
HQ=A high quality circuit for
Integrated=Combination of two entities to act like one
Interface=Junction between two dissimilar entities
Isometric=Drawings with equality of measure with prototype of the inventor
OEM=Original Equipment Manufacturer
Symmetrical=The shape of an object of integrated entity which can be divided into two along some axis through the object or the integrated entity such that the two halves form mirror image of each other.
Thermoelectric=A device to generate a thermal gradient when direct current power is applied.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention.

What is claimed is:

1. A direct current mini air-conditioning system for confined space in a parked transport vehicle comprising:
   a) a bifurcated hot and cold cabin housed in said transport vehicle and having a common ambient air inlet;
   b) an HQ coupled thermoelectric cooling unit mounted in a said bifurcated cabin of said motor vehicle;
   c) a deep cycle marine direct current source connected to said cooling unit;
   d) a battery charger; and
   e) a switch connected in series with said direct current source and said cooling unit.

2. The direct current mini air-conditioning system for confined space of claim 1 wherein said cooling unit comprises a thermoelectric module.

3. The direct current mini air-conditioning system for confined space of claim 2 wherein said thermoelectric module comprises a solid-state thermo electric integrated circuit chip.

4. The direct current mini air-conditioning system for confined space of claim 3 wherein a cold sink is connected to said solid state thermo-electric integrated circuit chip and a heat sink is connected to said thermo electric module.

5. The direct current mini air-conditioning system for confined space of claim 1 wherein said cabin is housed in a motor vehicle.

6. The direct current mini air-conditioning system for confined space of claim 5 wherein said motor vehicle is a truck.

7. The direct current mini air-conditioning system for confined space of claim 1 wherein said cabin is housed in a watercraft.

8. The direct current mini air-conditioning system for confined space of claim 1 wherein said cabin is housed in an aircraft.

9. The direct current mini air-conditioning system for confined space of claim 1 wherein said cooling unit comprises a high efficiency direct current compressor.

10. The direct current mini air-conditioning system for confined space of claim 9 wherein said cooling unit comprises HFC-134A as refrigerant.

11. The direct current mini air-conditioning system for confined space of claim 9 wherein said motor vehicle is a truck.

12. The direct current mini air-conditioning system for confined space of claim 9 wherein said cabin is housed in a watercraft.

13. The direct current mini air-conditioning system for confined space of claim 11 wherein said cooling unit comprises cold storage phase change material.

14. The direct current mini air-conditioning system for confined space of claim 13 wherein said motor vehicle is a truck.

15. The direct current mini air-conditioning system for confined space of claim 13 wherein said cabin is housed in a watercraft.

16. A process of controlling and monitoring the temperature and humidity of a confined space cabin comprising;
   a) insulating said confined space cabin;
   b) installing a plurality of solid state cooling Thermoelectric Chips of total capacity of over 2,400 BTU mounted on a heat sink;
   c) connecting a first blower which vents out the hot air from said heat sink out side said cabin;
   d) connecting a second blower to blow the cold air to the cabin;
   e) connecting a direct current marine deep cycle discharge battery of at least 240 AmpHr capacity battery;
   f) mounting at least one solar panel on the roof of said cabin as a means for generates sufficient electricity to at least trickle charge said marine battery when the cabin cooler is not in use.

17. The process of controlling and monitoring the temperature and humidity of a confined space cabin of claim 16 wherein an electrical conducting path is provided from the truck alternator to charge said marine battery when the engine is turned on.

18. A personal portable direct current mini air-conditioning system comprising:
   a) a bifurcated chamber comprising a hot chamber and a cold chamber and having a common ambient air inlet;
   b) a cooling module housed in said bifurcated chamber to provide cold air to said cold chamber and hot air to said hot chamber;
   c) a hot air fan housed in said hot chamber for venting out hot air from said hot chamber;
   d) a deep cycle marine direct current battery is connected to said cooling module;
   e) said direct current marine battery is interfaced to a charged by a panel of solar cells; and
   f) a cold air fan housed in said cold chamber for communicating cold air to a desired location.

19. A personal portable direct current mini air-conditioning system of claim 18 wherein said cooling module comprises a thermo electric module which in turn comprises a thermo electric integrated circuit mounted on a heat sink.

20. A personal portable direct current mini air-conditioning system of claim 19 wherein:
   a) an HQ circuit is connected to said thermo electric module;
   b) a digital display is interfaced to said thermoelectric module for monitoring temperature and humidity;
   c) a thermostat is housed outside said bifurcated chamber; and
   d) a switch connected in series with said direct current source.

* * * * *